Sept. 29, 1936. T. J. FEGLEY ET AL 2,056,097
ICE CRACKER FOR TUMBLERS
Filed April 18, 1935
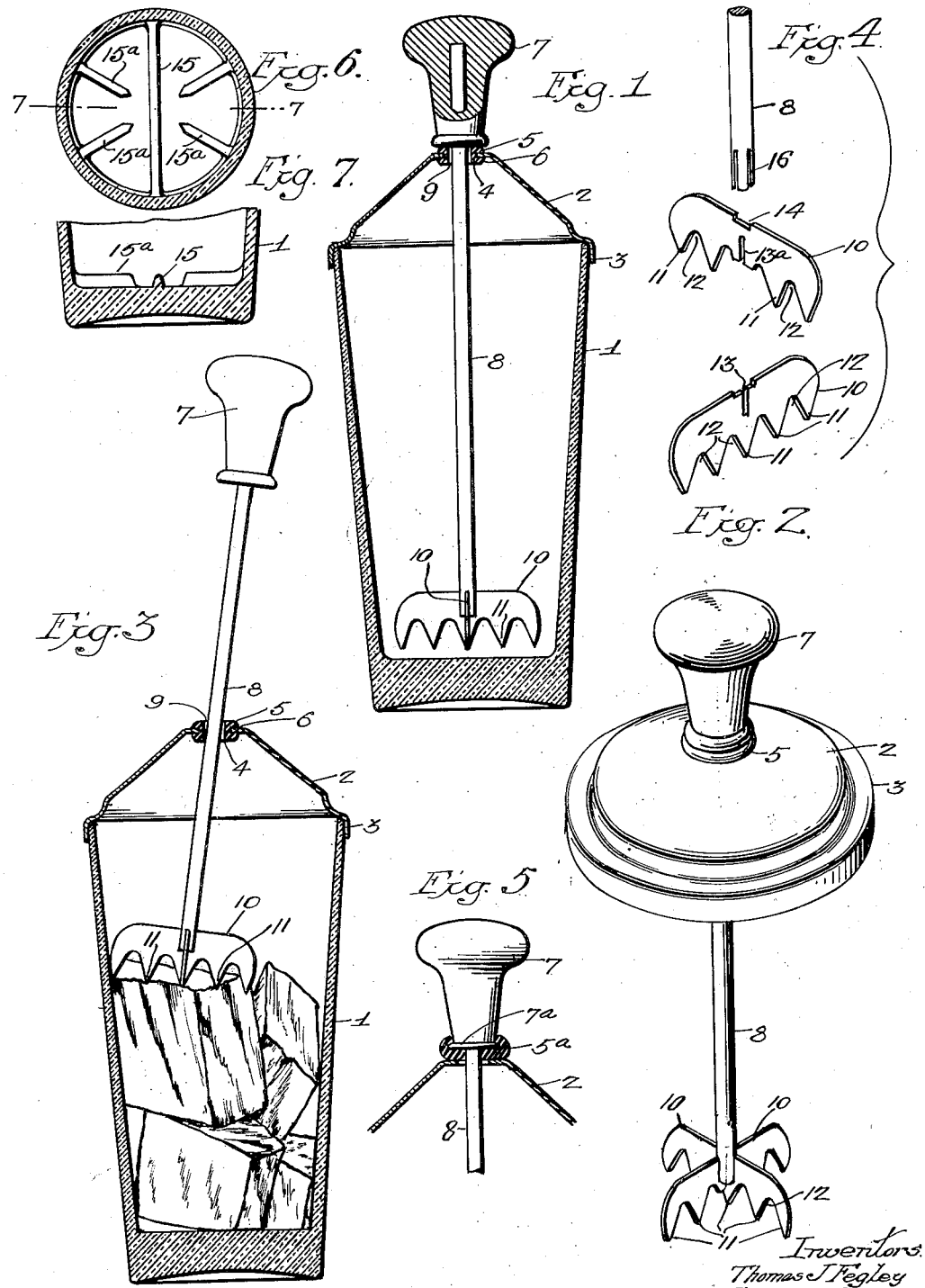
Inventors
Thomas J Fegley
George O. Leopold
by their Attorneys

UNITED STATES PATENT OFFICE 2,056,097

ICE CRACKER FOR TUMBLERS

Thomas J. Fegley, Jenkintown, and George O. Leopold, Philadelphia, Pa., assignors to North Bro.'s Mfg. Co., Philadelphia, Pa., a corporation of Pennsylvania Application April 18, 1935, Serial No. 17,120

1 Claim. (Cl. 83—62)

One object of the invention is to provide a simple and effective ice cracker, which can be used in a tumbler or like receptacle.

A further object of the invention is to provide an ice cracker which is free to move laterally in the cap which fits over the top of the tumbler so that the stem can be moved from one side of the tumbler to the other to crack all particles of the ice within the tumbler.

A still further object of the invention is to so design the cracking element that it will penetrate the cracked ice to a point near the bottom of the tumbler, insuring the cracking of the entire mass of ice in the tumbler.

A still further object of the invention is to provide a heavy handle which acts as a weight to aid in cracking the ice. The invention also relates to the special construction of the toothed cracking element.

The invention also relates to certain details described hereinafter.

These objects, we attain in the following manner, reference being had to the accompanying drawing, in which:

Figure 1 is a section view of our improved ice cracker for tumblers;

Fig. 2 is a detached perspective view of the stem and cap;

Fig. 3 is a view showing the loose joint between the stem and the cap to allow the plunger to move laterally in the tumbler.

Fig. 4 is a perspective view of a portion of the stem showing the blades detached.

Fig. 5 is a sectional view showing a modification in which a cushion is secured to the handle.

Fig. 6 is a plan view illustrating a modification of the bottom of the tumbler; and Fig. 7 is a sectional view on line 7—7 of Fig. 6.

1 is a glass tumbler of any suitable type and has a heavy bottom which is substantially flat, in the present instance, and has comparatively heavy tapered sides so that, even in rough usage, the tumbler will not crack. 2 is a cap that fits over the top of the tumbler and has a flange 3 which extends below the edge of the tumbler so as to hold the cap in position. In the cap is an opening 4 and within this opening is a rubber grommet 5 which has an annular groove 6 to allow the grommet to fit the edge of the hole in the cap. The grommet deadens the sound of the cracking device, and acts as a cushion for the handle 7 of the cracking device and it also limits the downward movement of the said device to prevent it from coming in contact with the bottom of the glass, as it has been found that the constant cracking of ice with the ordinary cracking means tends to chip small particles from the surface of the glass, making this type of cracking device very dangerous.

The stem 8 of the cracking device passes freely through an enlarged opening 9 in the grommet so that the stem is free to move laterally. At the lower end of the stem is a cracking element consisting of a series of narrow blades 10 which radiate from the stem and are secured thereto in any suitable manner. At the lower edges of the blades are a series of sharp teeth 11, the gullets 12 between the teeth being deep so as to allow the teeth to penetrate the ice and break the cubes into small particles. By making the cracking element with radial blades 10, the blades can readily pass particles of broken ice insuring the cutting into small pieces of the entire mass of ice in the tumbler. The bottom of the tumbler is substantially flat, and the sides are tapered which improve the efficiency of the device.

The cracking element proper which is formed by the blades is less in width than the tumbler and by having a loose joint between the cap and the stem, the cracking device can be moved laterally in the tumbler to insure cracking all particles of ice. The handle 7 which is secured at the upper end of the stem is in the form of a weight which aids in cracking the ice.

While we prefer to mount the rubber grommet 5 on the cap, in some instances, it may be secured to the lower portion of the handle 7 as shown in Fig. 5. In this instance, the handle 7 has a flange 7a and the grommet 5a is shaped so as to encircle the flange, thus retaining it in position on the end of the handle, the opening in the cap is much larger than the stem to allow for lateral movement of the ice cracking device as described above.

While our invention is particularly adapted for cracking ice cubes, it will be understood that it can be used for cracking ordinary pieces of ice without departing from the essential features of the invention and, while it is particularly used in connection with a glass tumbler, it can be used also with tumblers of other material.

The toothed blades at the end of the stem are preferably made as shown in Fig. 4. The blades 10 are stamped from sheet metal and each blade has a notch at the center, notch 13a in one blade is at the lower portion of the blade and the notch 13 in the other blade is at the upper portion thereof so that the two blades will interlock when in position. The upper edge of each blade is recessed at 14. The stem 8 has two longitudinal slots 16 at its lower end which are at right angles to one another, and into which the blades 10 extend. The blades are forced into the slot until they seat against the body of the stem and the body of the stem is in the recesses 14, after which the stem and blades are tinned, the tinning holding the blades firmly to the stem.

In Figures 6 and 7 we have illustrated a modification of the tumbler. Instead of making the interior of the bottom of the tumbler flat and smooth, we may provide a series of radiating ribs 15, 15a as clearly shown in Fig. 6. These ribs are preferably tapered, and in the present instance one rib 15 extends entirely across the tumbler and the other ribs 15a stop short of the center. This arrangement not only tends to hold the ice while being broken, but also aids in breaking the ice.

We claim:

The combination of a tumbler having a substantially flat bottom and tapering sides, of a cap fitting over the tumbler and having a central opening therein, a stem which passes freely through the opening in the cap, a cracking element secured to the lower end of the stem, said element consisting of a series of crossed radiating blades relatively thin in cross-section and short in axial dimension, the blades having sharp teeth in the planes of the blades at their lower ends with deep gullets for cracking the ice, the blades lying in planes parallel to the axis of the stem, the cracking device being considerably less in diameter than the interior of the tumbler to allow it to be moved laterally within the tumbler.

THOMAS J. FEGLEY.
GEORGE O. LEOPOLD.